United States Patent
Matthews et al.

(10) Patent No.: US 8,911,103 B2
(45) Date of Patent: Dec. 16, 2014

(54) ADJUSTABLE PORTABLE LIGHT

(71) Applicant: SureFire, LLC, Fountain Valley, CA (US)

(72) Inventors: John W. Matthews, Newport Beach, CA (US); Ronald S. Gibson, Valencia, CA (US); Michael D. Anderson, Anaheim, CA (US); Michael D. Picciotta, Yorba Linda, CA (US); Hien Nguyen, Westminster, CA (US)

(73) Assignee: SureFire, LLC, Fountain Valley, CA (US)

( * ) Notice: Subject to any disclaimer, the term of this patent is extended or adjusted under 35 U.S.C. 154(b) by 0 days.

(21) Appl. No.: 13/737,403

(22) Filed: Jan. 9, 2013

(65) Prior Publication Data
US 2013/0182423 A1    Jul. 18, 2013

Related U.S. Application Data

(60) Provisional application No. 61/586,699, filed on Jan. 13, 2012.

(51) Int. Cl.
| | |
|---|---|
| *F21L 4/04* | (2006.01) |
| *F21V 17/16* | (2006.01) |
| *B62J 11/00* | (2006.01) |
| *F21V 33/00* | (2006.01) |
| *F21L 4/02* | (2006.01) |
| *B62J 6/02* | (2006.01) |
| *F21V 17/02* | (2006.01) |
| *A45F 5/02* | (2006.01) |
| *F21Y 101/02* | (2006.01) |

(52) U.S. Cl.
CPC .............. *F21L 4/04* (2013.01); *F21V 17/168* (2013.01); *F21Y 2101/02* (2013.01); *B62J 11/00* (2013.01); *A45F 2200/0566* (2013.01); *F21V 33/0008* (2013.01); *F21L 4/027* (2013.01); *B62J 6/02* (2013.01); *F21V 17/02* (2013.01); *A45F 5/02* (2013.01)
USPC .......................... 362/191; 362/190; 362/396

(58) Field of Classification Search
USPC .................................. 362/191, 396
See application file for complete search history.

(56) References Cited

U.S. PATENT DOCUMENTS

| | | | | | |
|---|---|---|---|---|---|
| 2,361,414 | A | * | 10/1944 | Ramsey | 362/108 |
| 2,402,877 | A | * | 6/1946 | Dial | 248/205.5 |
| 4,506,317 | A | * | 3/1985 | Duddy | 362/396 |
| D324,109 | S | * | 2/1992 | Caridi | D26/140 |
| 6,616,294 | B1 | * | 9/2003 | Henry | 362/106 |
| 8,360,597 | B1 | * | 1/2013 | Hanchett | 362/190 |
| 2002/0167806 | A1 | * | 11/2002 | Thaxton | 362/191 |
| 2003/0161139 | A1 | * | 8/2003 | Putallaz | 362/108 |
| 2008/0089058 | A1 | * | 4/2008 | Galli et al. | 362/191 |
| 2010/0165612 | A1 | * | 7/2010 | Yeh | 362/190 |
| 2012/0182727 | A1 | * | 7/2012 | Sharrah et al. | 362/190 |
| 2012/0236543 | A1 | * | 9/2012 | Torgerson | 362/106 |

OTHER PUBLICATIONS

U.S. Appl. No. 29/410,908, filed Jan. 13, 2012, Inventors: Matthews et al., 17 pages.

* cited by examiner

*Primary Examiner* — Laura Tso

(74) *Attorney, Agent, or Firm* — Haynes and Boone, LLP

(57) ABSTRACT

A portable light includes: a cylindrical housing having a longitudinal axis and receiving a bezel and a lamp for projecting a light radially away from the longitudinal axis; and a cradle assembly including a clamp for receiving the cylindrical housing, wherein the clamp includes a plurality of features for engaging selected ones of corresponding features on the cylindrical housing to secure the cylindrical housing at a selected rotational position about its longitudinal axis with regard to the cradle assembly.

20 Claims, 7 Drawing Sheets

ADJUSTABLE PORTABLE LIGHT

RELATED APPLICATION

This patent application claims priority to and the benefit of U.S. Provisional Patent Application No. 61/586,699, filed Jan. 13, 2012, the contents of which are incorporated herein in their entirety.

TECHNICAL FIELD

This application relates to portable lights such as headlamps and flashlights, and more particularly, to a portable light adapted to be spatially adjustable with regard to a base.

BACKGROUND

Portable lights using light emitting diodes (LEDs) are rapidly replacing conventional sources of illumination such as incandescent bulbs. LEDs are significantly more efficient that incandescent bulbs and thus offer greater illumination power and battery life. Moreover, LEDs are typically less fragile and are thus more robust than incandescent bulbs.

LEDs are not the only recent advance in the flashlight arts. For example, given their light weight yet powerful illumination power from relatively small batteries, it is conventional to mount LEDs in headlamps. In such headlamps, the light source is mounted to a headband such that a user can typically adjust the elevation angle of the light beam. Similar light sources can be mounted to vests and offer analogous adjustability. However, the adjustability of the light with respect to its mount makes it difficult or cumbersome to remove the light source should the user desire to use it as a handheld flashlight.

Accordingly, there is a need in the art for providing improved flashlight mounts that enable positioning of the light beam while still allowing a quick disconnect of the flashlight from its mount.

SUMMARY

In accordance with a first embodiment of the invention, a portable light is provided that includes: a cylindrical housing having a longitudinal axis and receiving a bezel and a lamp for projecting a light radially away from the longitudinal axis, the housing including a plurality of first engaging features; and a cradle assembly including a clamp for receiving the cylindrical housing, wherein the clamp includes a plurality of second engaging features, the cradle assembly being biased to engage selected ones of the first and second engaging features together to secure the cylindrical housing in a desired rotation about its longitudinal axis with regard to the cylindrical housing.

In accordance with a second embodiment of the invention, a portable light is provided that includes: a cylindrical housing having a longitudinal axis and receiving a bezel and a lamp for projecting a light radially away from the longitudinal axis; a cradle assembly including a clamp for receiving the cylindrical housing, wherein the clamp includes a plurality of first features for engaging selected ones of a plurality of second features on the cylindrical housing to secure the cylindrical housing at a selected rotational position about its longitudinal axis with regard to the cradle assembly; and a pivoting mount for rotatably receiving the cradle assembly with respect to a plane defined by the pivoting mount.

In accordance with a third embodiment of the invention, a method is provided that includes: biasing a pair of tabs together to open a clamp; rotating a cylindrical housing within the opened clamp to a desired orientation, wherein the rotation is about a longitudinal axis of the cylindrical housing, the cylindrical housing including a flashlight bezel projecting radially with regard to the longitudinal axis; and releasing the tabs to secure the cylindrical housing within the clamp at the desired orientation.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
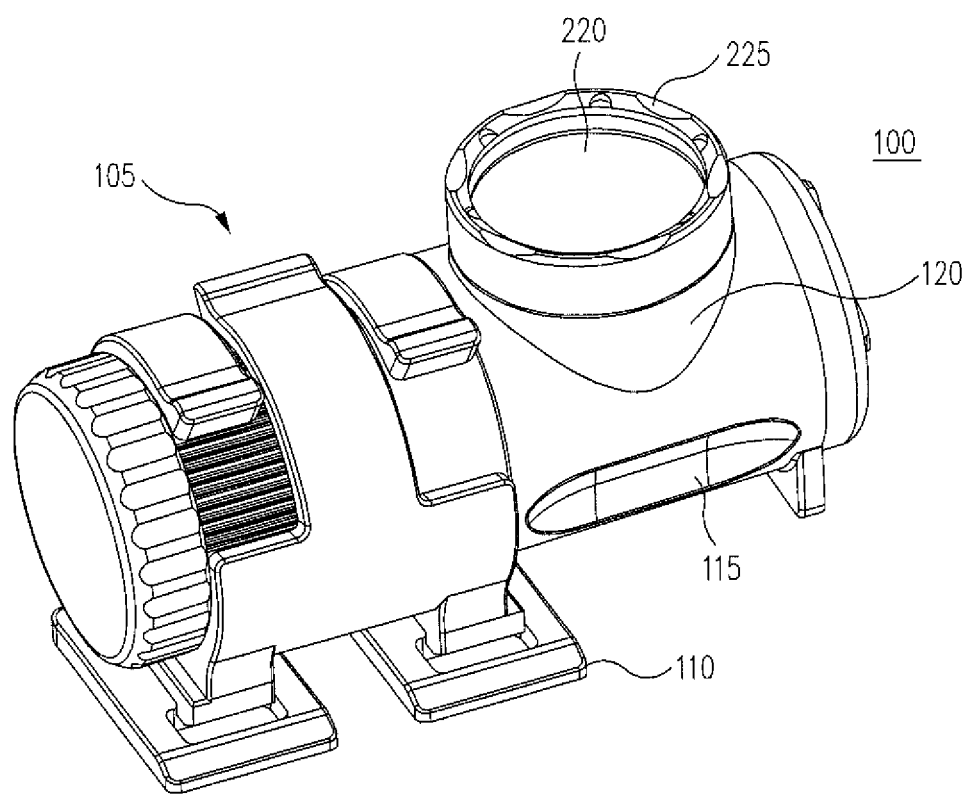
FIG. 1 is a perspective view of a portable light in accordance with a first embodiment.
Figure 2:
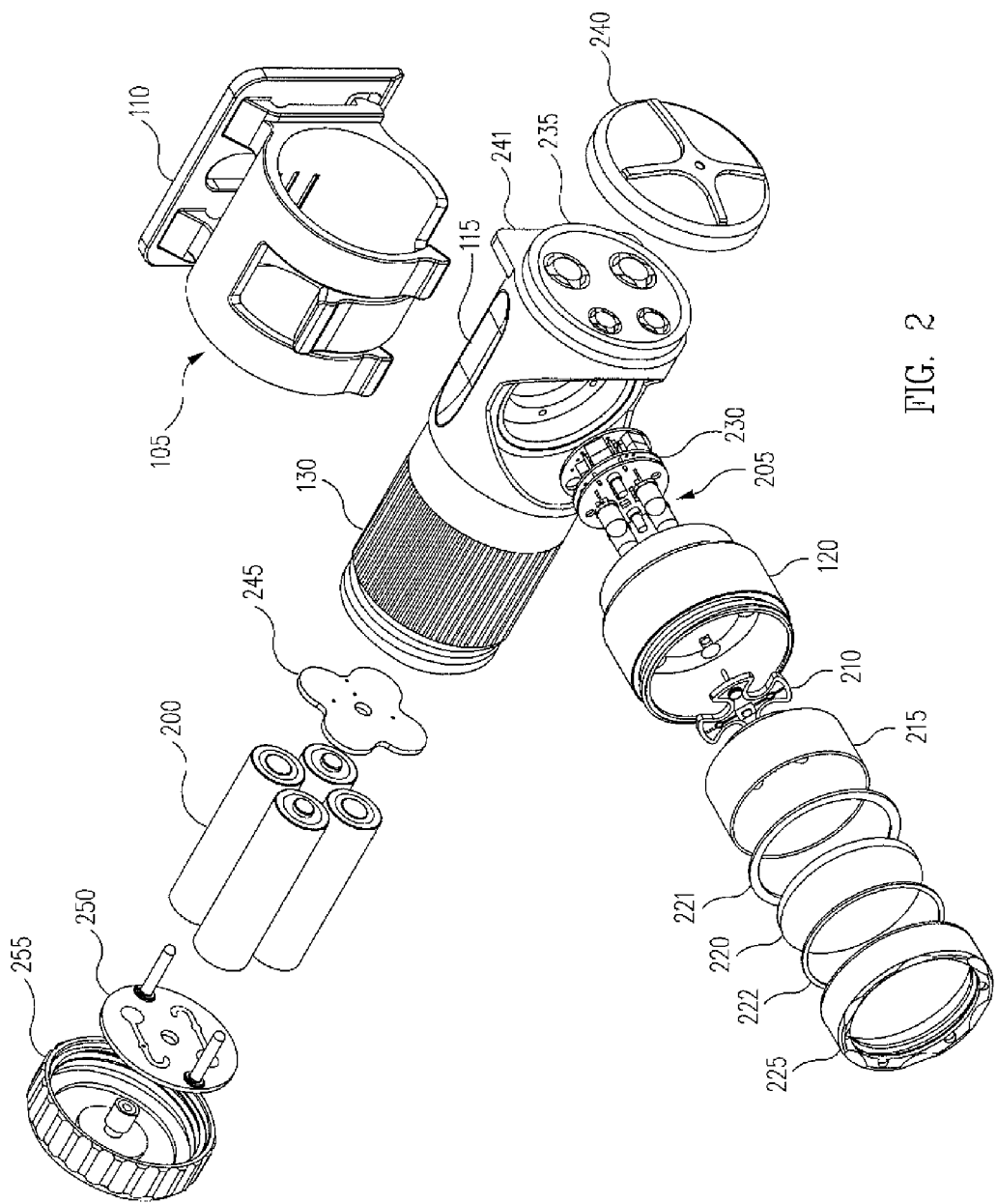
FIG. 2 is an exploded view of the portable light of FIG. 1.

Turning now to the drawings, FIG. 1 shows an example portable light 100 adjustably held in a cradle assembly 105 that in turn is secured to a mount 110. Cradle assembly 105 holds a cylindrical housing 115, which may be better seen in the corresponding exploded view of FIG. 2. Housing 115 provides a longitudinally-extending casing for batteries such as four AA batteries 200. A flashlight bezel 120 projects radially from housing 115. Bezel 120 receives a plurality of LEDs 205 mounted on an LED board 210. As is conventional in the flashlight arts, bezel 120 also receives a reflector 215 and a lens 220. A retainer 225 is threadably received by bezel 120 to secure lens 220 as well as associated seals 221 and 222 to bezel 120. Because bezel 120 is directed radially with regard to the longitudinal axis of housing 115, light will also project radially with regard to this longitudinal axis.

Advantageously, a user may readily rotate the position of housing 115 (and hence angularly adjust a light beam projected from lens 220) with respect to cradle assembly 105. During normal operation, cradle assembly 105 rigidly clamps housing 115 in a fixed orientation. For example, as seen in FIG. 1, the fixed orientation may be one of projecting the light beam orthogonally with respect to a plane formed by mount 110. However, a user may desire another orientation such that the projected light is tilted with regard to the mount plane, which is readily achieved as described further herein.

Figure 3:
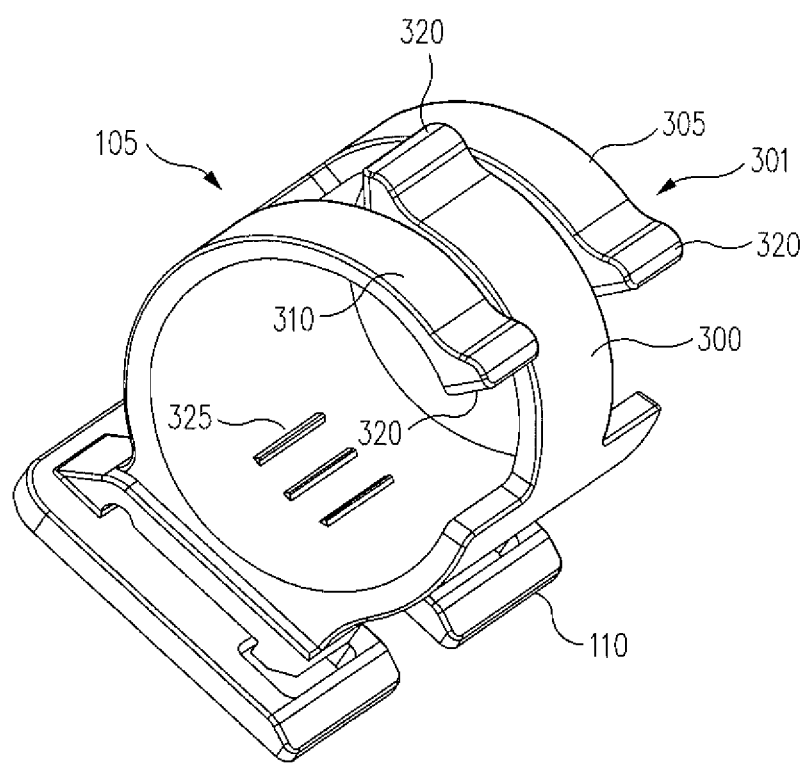
FIG. 3 is a perspective view of the cradle assembly and associated mount for the adjustable light of FIG. 1.

Cradle assembly 105 forms a spring clamp 301 to hold housing 115 such as shown in FIG. 3. In one embodiment, clamp 301 includes a center flange 300 that interdigitates between a pair of outer flanges 305 and 310. Each flange (300, 305 and 310) ends in a raised tab 320. A user may thus readily pinch center flange 300 towards either of the outer flanges using just two fingers. For example, a thumb may engage tab 320 on outer flange 310 while an index finger engages tab 320 on center flange 300. By pinching or biasing these two fingers together, the user not only biases center flange 300 away from outer flange 310 but also from outer flange 305 so as to expand spring clamp 301. The user could then simultaneously longitudinally move housing 115 away from clamp 301 to free housing 115 so as to use portable light 100 as a conventional hand-held flashlight. In contrast, the conventional flashlight mounting techniques such as through the use of a friction-coupling do not provide such a readily dismountable housing from its cradle.

A variety of engaging mechanisms may be used for spring clamp 301 to hold housing 115. For example, an inner surface of spring clamp 301 may include a plurality of elongated ridges 325 configured to engage with corresponding elongated grooves 130 (FIG. 2) on an inner surface of cradle assembly 105. Both ridges 325 and grooves 130 are aligned with the longitudinal axis of housing 115. Ridges 325 may circumferentially surround housing 115 such that a user may selectively position housing 15 across a full revolution on its longitudinal axis with respect to cradle assembly 105. In general, however, a user will typically want to project the light beam away from mount 110 such that the practical range of rotational positioning for housing 115 is one hundred and eighty degrees. At either end of this angular range, the light beam would project in the plane defined by mount 110. The orientation of housing 115 to mount 110 shown in FIG. 1 would thus correspond to 90 degrees in this range of 180 degrees. Note that ridges (or lands) 325 and grooves 130 may be interchanged. In other words, the grooves may be placed on housing 115 and the ridges on the inner surface of cradle assembly 105. In that regard, housing 115 may be considered to have a set of first engaging features and cradle assembly to have a set of corresponding second engaging features, wherein the first and second sets are configured to engage with each other.

During normal operation, the spring force from spring clamp 301 rigidly engages grooves 130 and ridges 325 in whatever rotational orientation housing 115 has been set with regard to cradle 105—but note that such an ability to freely select a rotational position assumes that grooves 130 cover a sufficient circumferential range of housing 115 to be able to engage ridges 324 in the desired rotational position of housing 115. Should grooves 130 cover only a partial circumference of housing 115, then the rotational positioning is curtailed accordingly. It will be appreciated that as the diameter of grooves 130 (and thus the corresponding diameter of ridges 325) is decreased, the finer is the incremental tolerance for the resulting position-ability of housing 115 with respect to cradle 105.

Mount 110 may comprise a standardized Molle mount so that cradle 105 may be mounted to Molle-compatible vests and other articles. Referring again to FIG. 2, housing 115 includes a suitable recess to receive bezel 120 and printed circuit board 230. A distal end of housing 115 receives a switch circuit board 235 and a corresponding switch boot 240. In one embodiment, several switches are provided to invoke various operating modes such as variable-output primary LED activation mode, a secondary white-LED illumination mode, a secondary red-LED illumination mode, and a maximum-output primary LED illumination mode. Housing 115 may include a straight-edge anti-roll feature 241 to prevent housing 115 from rolling on surfaces when removed from cradle 105. Batteries 200 may be received by corresponding printed circuit boards 245 and 250. A battery compartment cap 255 threadably engages a proximal end of housing 115 to contain batteries 200 within housing 115.

Figure 4:
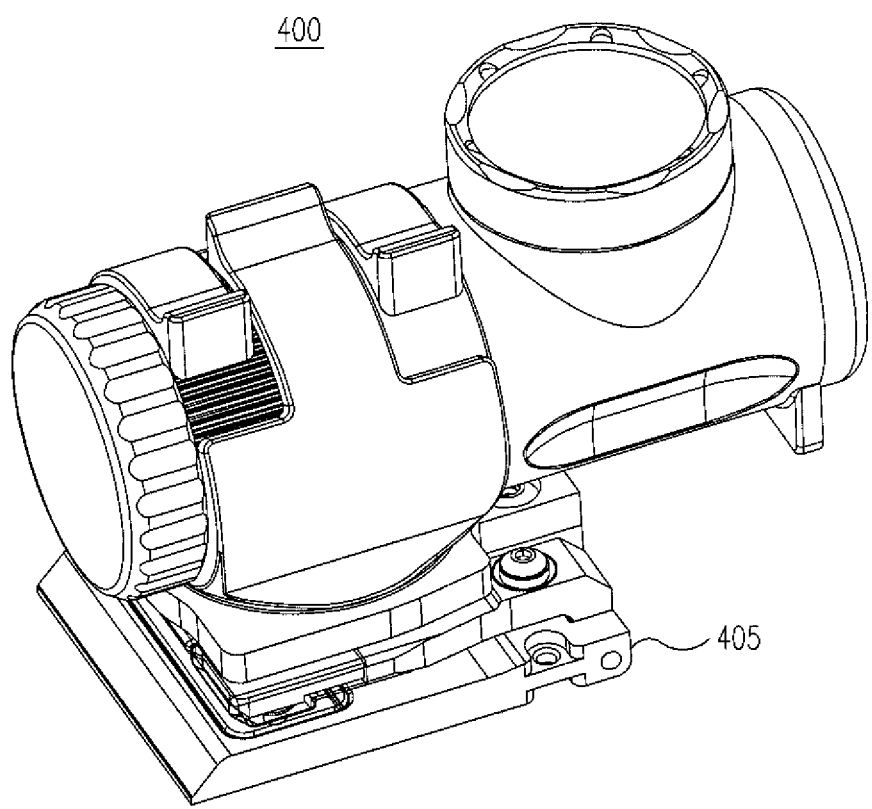
FIG. 4 is a perspective view of a portable light including a rotatable cradle and a swiveling mount.
Figure 5:
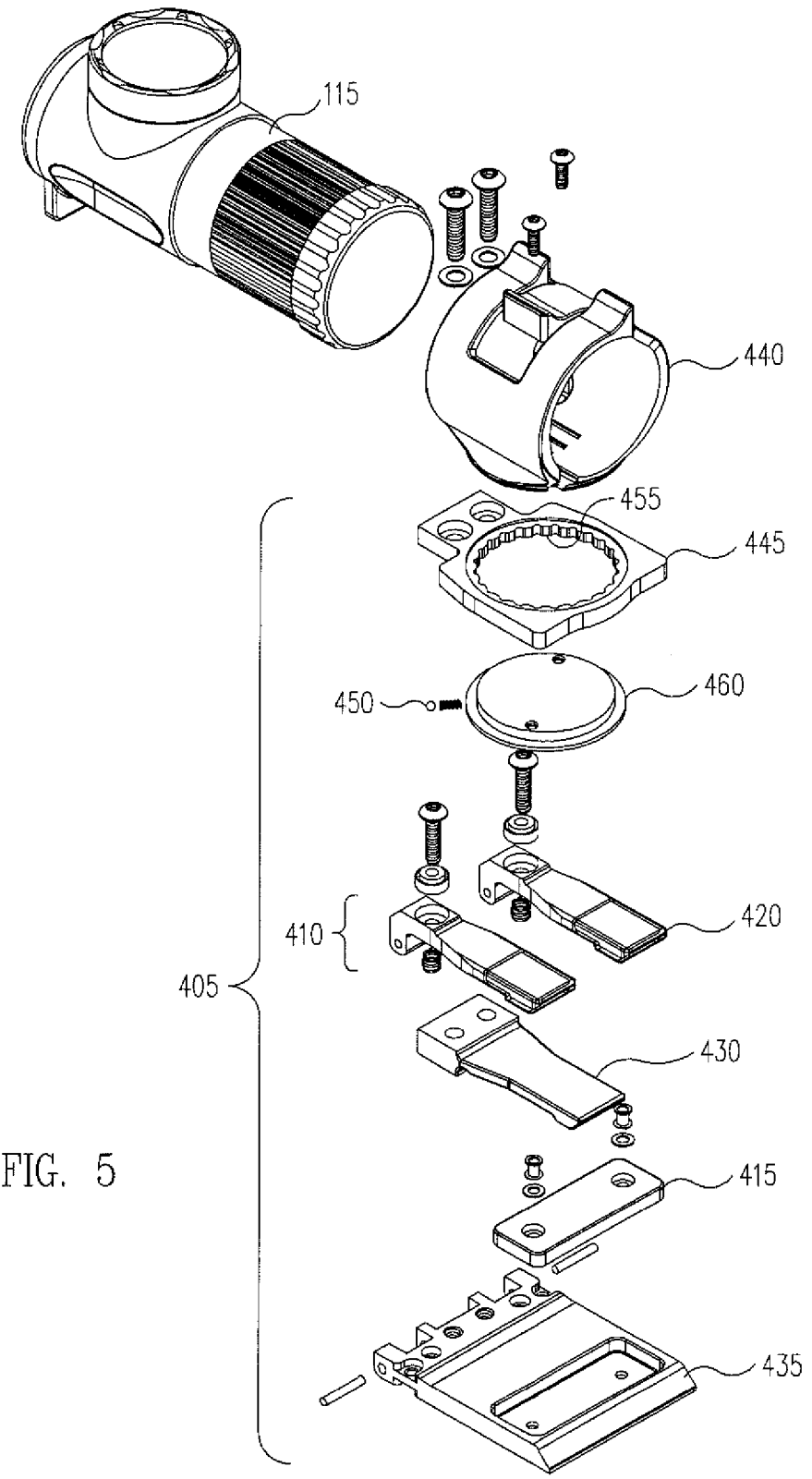
FIG. 5 is an exploded view of the portable light of FIG. 4.
Figure 6:
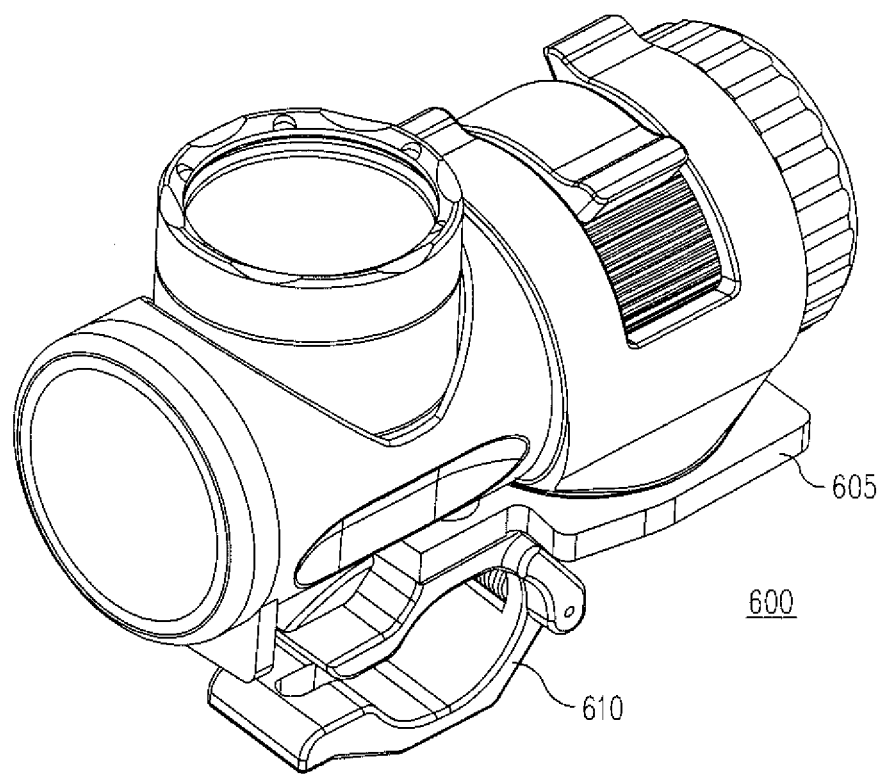
FIG. 6 is a perspective of a portable bicycle light including a rotatable cradle and a swiveling handlebar or frame mount.
Figure 7:
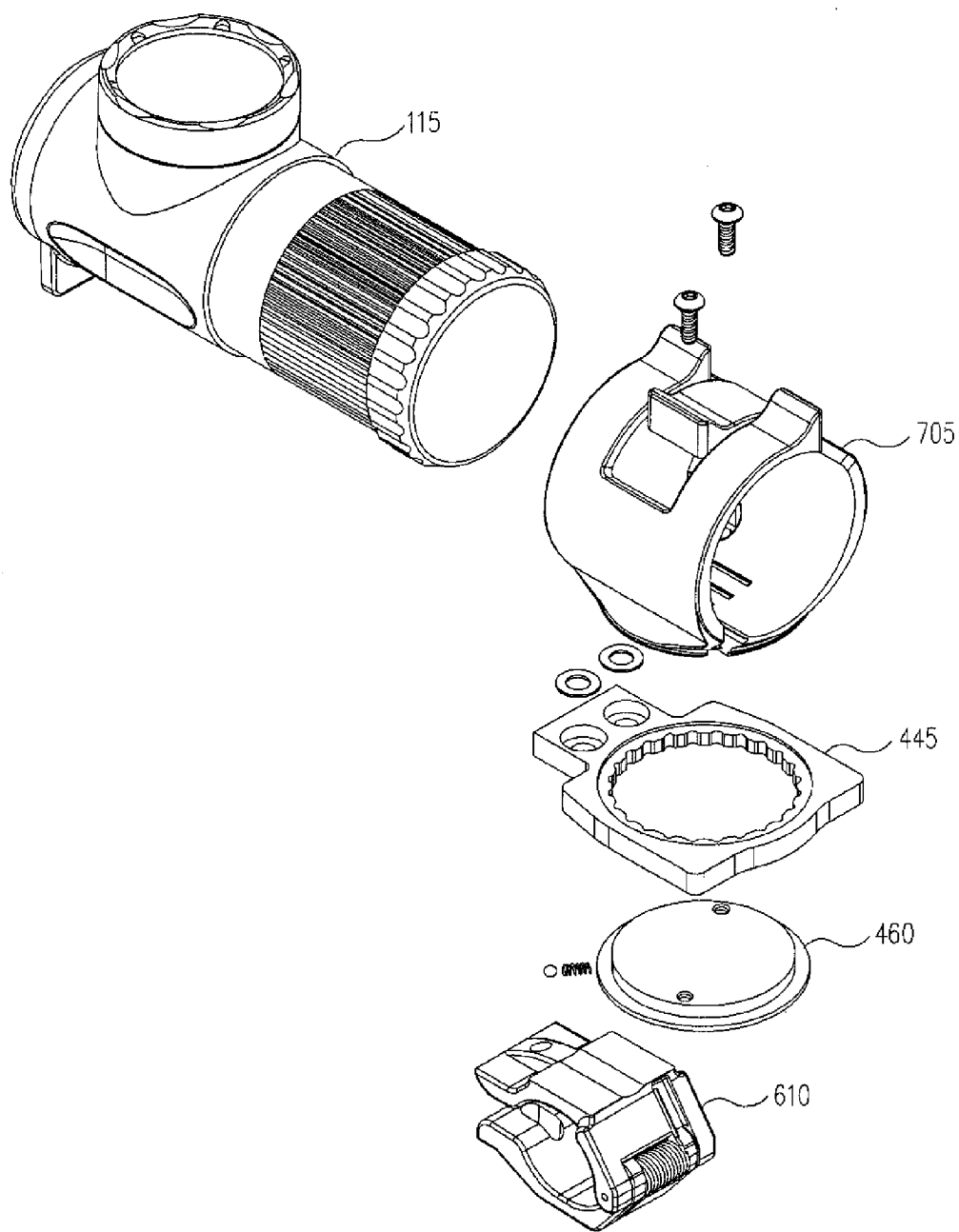
FIG. 7 is an exploded view of the portable bicycle light of FIG. 6.

Although portable light 100 thus advantageously enables a quick dismount from cradle 105 yet provides a rotational adjustment on the longitudinal axis of housing 115, a user may desire even greater adjustability such as through the swiveling mount of portable light 400 shown in FIGS. 4 and 5 and also for portable bicycle light 600 shown in FIGS. 6 and 7. Portable light 400 includes a mount 405 that clips onto a user's clothing or other suitable material. As seen in the exploded view of FIG. 5, mount 405 comprises a plurality of cantilever arms 410 that act to bias a captured piece of the user's clothing (e.g., a vest pocket) against a friction pad 415 held in a mounting pad 435. To assist in the frictional grasp of the user's clothing, the distal ends of arms 410 may be made resilient such as through the addition of room temperature vulcanizing (RTV) pads 420. An additional cantilever arm 430 may aid in providing friction. A cradle assembly 440 holds housing 115 as discussed with regard to cradle assembly 105 of FIGS. 1-3. In contrast to cradle assembly 105, cradle assembly 440 pivots in the plane defined by mounting pad 435 through the action of a rotational base 445. Rotational base 445 includes a circular opening lined by gear teeth 455. A biased ball detent 450 engages gear teeth 455. Ball detent 450 is biased with regard to a fixed mount 460 so that rotational base 445 can be held in a desired rotation with regard to mounting pad 435 and fixed mount 460. A user thus can both pivot housing 115 about a radial axis defined through mounting pad 435 and also about its longitudinal axis with regard to cradle 440.

An analogous pivoting base 605 may be used for portable bicycle light 600 of FIGS. 6 and 7. Pivoting base 605 mounts through a clamp 610 to a bicycle component such as the handlebars or the frame. There is no need for any cantilever arms to grasp clothing so a cradle 705 holding the housing for light 600 rotatably mounts to clamp 600 through rotational base 445 and fixed base 460 as discussed analogously with regard to portable light 400 of FIGS. 4 and 5.

Embodiments described above illustrate but do not limit the invention. Thus, it should also be understood that numerous modifications and variations are possible in accordance with the principles of the present invention. Accordingly, the scope of the invention is defined only by the following claims.

We claim:

1. A portable light, comprising:
   a cylindrical housing having a longitudinal axis and receiving a lamp for projecting a light radially away from the longitudinal axis, the housing including a plurality of first engaging features; and
   a cradle assembly including a clamp for receiving the cylindrical housing, wherein the clamp includes a plurality of second engaging features, the cradle assembly being biased to engage selected ones of the first and second engaging features together to secure the cylindrical housing about its longitudinal axis with regard to the cradle assembly, the cylindrical housing being adapted to rotate about its longitudinal axis and among a plurality of discrete fixed rotational positions determined by the first and second engaging features while remaining secured within the clamp.

2. The portable light of claim 1, wherein the clamp includes a center flange that interdigitates between a pair of outer flanges.

3. The portable light of claim 2, wherein the center flange and the outer flanges each ends in a raised tab.

4. The portable light of claim 1, wherein the lamp comprises an LED.

5. The portable light of claim 4, wherein the LED comprises a plurality of LEDs.

6. The portable light of claim 1, wherein the plurality of first engaging features comprises a plurality of longitudinally-extending ridges on the cylindrical housing.

7. The portable light of claim 6, wherein the plurality of second engaging features comprises a plurality of longitudinally-extending grooves on an inner surface of the clamp.

8. The portable light of claim 7, further comprising a mount secured to the cradle assembly.

9. The portable light of claim 8, wherein the mount is a Molle-compatible mount.

10. The portable light of claim 1, further comprising a pivoting mount for rotatably receiving the cradle assembly with respect to a plane defined by the pivoting mount.

11. The portable light of claim 8, wherein the mount is a Molle mount.

12. A method, comprising:
providing a portable light comprising;
   a cylindrical housing having a longitudinal axis, a lamp for projecting a light radially away from the longitudinal axis, and a plurality of first engaging features, and
   a cradle assembly including a clamp for receiving the cylindrical housing,
wherein the clamp includes a plurality of second engaging features;
biasing the cradle assembly to engage selected ones of the first and second engaging features together to secure the cylindrical housing about its longitudinal axis with regard to the cradle assembly; and
rotating the cylindrical housing about its longitudinal axis and among a plurality discrete fixed rotational positions determined by the first and second engaging features while remaining secured within the clamp.

13. The method of claim 12, wherein the clamp includes a center flange that interdigitates between a pair of outer flanges.

14. The method of claim 12, further comprising pivoting the cylindrical housing about a pivoting base connected to the clamp.

15. The method of claim 13, wherein the center flange and the outer flanges each ends in a raised tab.

16. The method of claim 12, wherein the plurality of first engaging features comprises a plurality of longitudinally-extending ridges on the cylindrical housing.

17. The method of claim 16, wherein the plurality of second engaging features comprises a plurality of longitudinally-extending grooves on an inner surface of the clamp.

18. The method of claim 12, wherein the portable light further comprises a Molle-compatible mount secured to the cradle assembly.

19. The method of claim 12, wherein:
the biasing is performed by first and second flanges of the clamp extending in substantially opposite directions around the cylindrical housing; and
the method further comprising pinching the first and second flanges to bias at least the first flange away from the second flange to expand the clamp; and
removing the cylindrical housing from the clamp while the clamp is expanded.

20. The portable light of claim 1, wherein:
the clamp includes first and second flanges extending in substantially opposite directions around the cylindrical housing and adapted to bias the clamp against the cylindrical housing to secure the cylindrical housing within the clamp; and
at least the first flange is adapted to bias away from the second flange in response to a user pinching the first and second flanges to expand the clamp to permit removal of the cylindrical housing from the clamp.

* * * * *